UNITED STATES PATENT OFFICE.

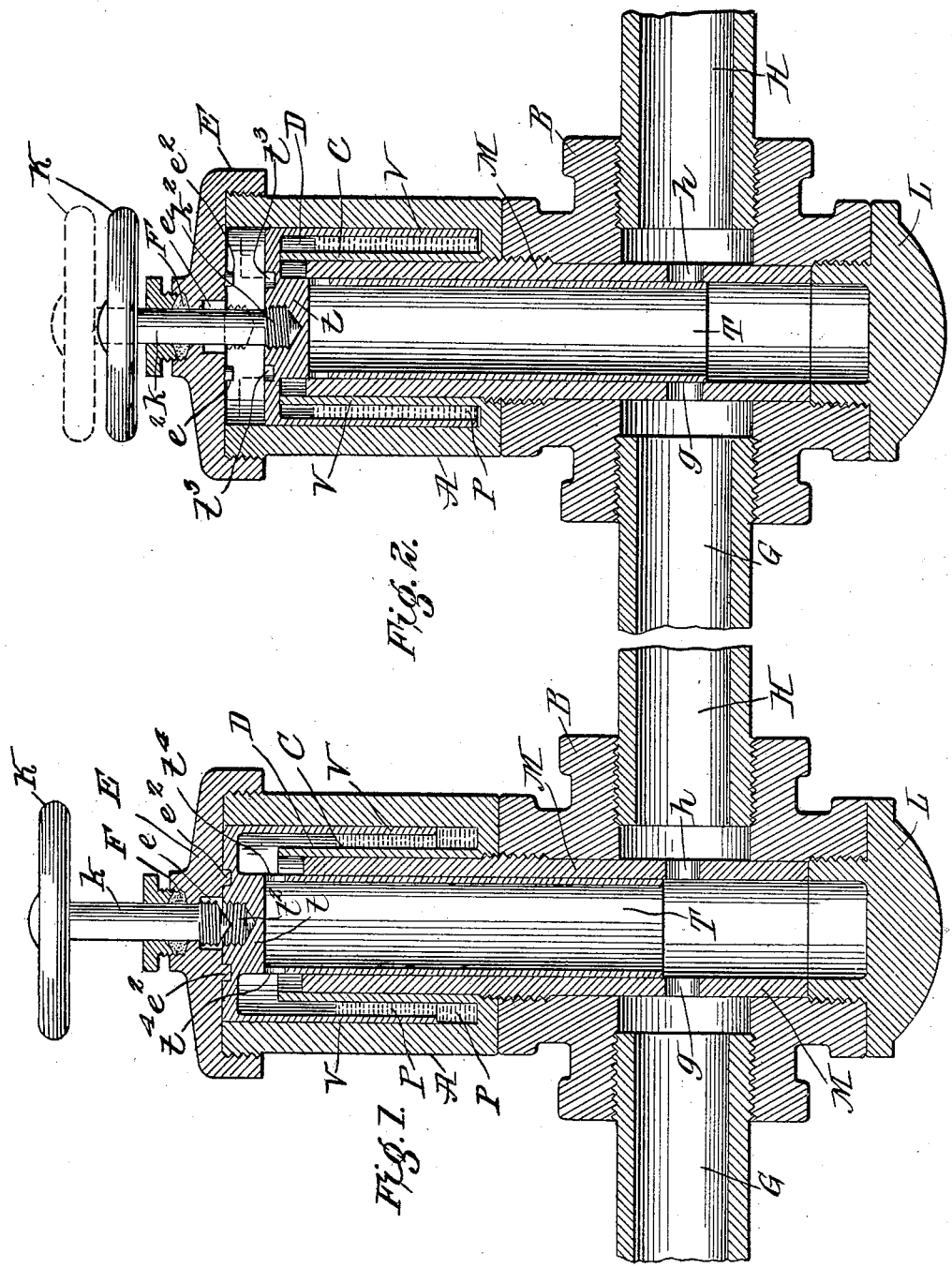

CHARLES E. LAHMERS, OF NEW PHILADELPHIA, OHIO.

AUTOMATIC CUT-OFF FOR GAS-MAINS.

946,515.  Specification of Letters Patent.  Patented Jan. 11, 1910.

Application filed April 26, 1909. Serial No. 492,274.

*To all whom it may concern:*

Be it known that I, CHARLES E. LAHMERS, a citizen of the United States, and a resident of New Philadelphia, in the county of Tuscarawas and State of Ohio, have made certain new and useful Improvements in Automatic Cut-Off for Gas-Mains, of which the following is a specification.

My invention relates to devices for preventing explosions or accidents caused by changes in the pressure in gas mains, and it consists in the constructions, combinations and arrangements herein described and claimed.

The invention is similar to one disclosed in my co-pending application Serial No. 482,299, filed March 9, 1909, the present application relating more particularly to the specific valve mechanism.

It often happens that the pressure on the mains of a city gas system becomes so low that at times the flow of gas from the jets communicating therewith is stopped altogether. This is especially true of the burners of gas stoves and the like, which, when left burning, will frequently go out at certain periods of the day when the pressure is low. If the cocks are not turned off, the gas begins to flow when the pressure comes on again and there is danger of an explosion when the gas is again lighted or the freely flowing gas itself is liable to fill the house or apartment with its poisonous fumes.

An object of my invention is to provide a device which will automatically shut off the flow of gas from the mains when the pressure therein becomes too low, thereby preventing the accidents which might otherwise occur.

A further object of my invention is to provide a device of few parts and of comparatively little cost for accomplishing the above results.

A further object of my invention is to provide an automatic cut off, whose working parts are entirely of metal, which will resist wear and last considerably longer than devices depending for their operation upon parts made of resilient material such as rubber or the like.

Further objects and advantages will appear in the following specification and the novel features of the invention will be particularly pointed out in the appended claims.

My invention is illustrated in the accompanying drawings in which—

Figure 1 is a central vertical section through the device showing it in an opened position, and Fig. 2 is a similar view showing the device in a closed position.

In carrying out my invention I provide a main casing consisting of an upper portion A and a lower portion B. The upper portion A is preferably a hollow cylinder and has a smaller cylinder C disposed within the outer cylinder but being joined to it at the bottom. This construction provides an annular space D between the two cylinders as clearly shown in the two drawings. The top of the cylinder B is closed by a screw threaded cap E, having a recess $e$, and provided with lugs $e^2$.

K is a handle which has a stem $k$ that extends downwardly through the cap and is provided on its lower end with a threaded member $k^2$.

The lower portion B of the casing is provided with an inlet pipe G and the outlet pipe H. A stationary tube M is threaded at $m$ to engage corresponding threads on both portions of the casing A and B so that the latter are held together. The cylinder M is provided with two openings $g$ and $h$. The lower end of the casing B is closed by a screw threaded cap L.

Within the cylinder M is disposed a slidable cylinder T which fits close to the interior walls of the cylinder M. The cylinder T is provided at its upper end with an integral head $t$ which joins the cylinder T with an outer concentric cylinder V which is disposed between the outer casing A and the cylinder C in the annular space D. The head $t$ is provided with a threaded recess $t^2$ into which the end $k^2$ of the stem $k$ is arranged to enter. It is also provided with recesses $t^3$ into which the lugs $e^2$ on the cap E may enter.

A packing gland F is provided for preventing the escape of gas into the building, in the event that the gas should get above the cylinder V. Ordinarily the screw member of the packing gland is left loose but in cases where the device is left in connection with the mains and is not intended to be used the gland may be screwed down tight on the rod $e$ so as to absolutely prevent any danger of leakage of the gas into the building.

From the foregoing description of the various parts of the device, the operation thereof may be readily understood. The cut-off may be located at any convenient place but is preferably placed in a building between the meter and the distributing pipes. The device is normally arranged as shown in Fig. 1. Before the device is assembled, a quantity of mercury P is poured into the annular space D. The amount of mercury used will vary with different sized cut-offs. The buoyant force of the mercury together with the gas pressure will keep the cylinder T in its upper position shown in Fig. 1. The gas enters the inlet $g$ from the pipe G and passes upward through the interior of the cylinder T and thence through the openings $t^4$ into the space between the surface of the mercury and the underside of the heat $t$. This pressure as stated before is sufficient to keep the cylinder T suspended. Now when the pressure becomes low the weight of the cylinder T, the head $t$ and the cylinder V causes these parts to descend, the cylinder V passing down into the mercury and taking the position shown in Fig. 2. The lower end of the cylinder T has now shut off the inlet and the outlet openings $g$ and $h$ whereupon the flow of gas is stopped. When it is desired to start the flow again after the pressure comes on, the handle K is depressed, until the head $k^2$ enters the recess $t^2$. A few turns of the handle secures the latter to the head $t$ which together with the cylinders T and V may be drawn up into the position shown in Fig. 1, the pressure being on these parts will be kept suspended. The handle may then be unscrewed from the top T (the lugs $t^3$ preventing the head from turning) and the device will be set, ready for cutting off the flow again should the pressure decrease.

I am aware that other forms of the device based upon the same general principle might be made but I consider as my own all such modifications as fairly fall within the spirit and the scope of my invention.

I claim:

1. An automatic cut off comprising a casing provided with a chamber and openings for the admission and exit of gas, a liquid disposed in said chamber, a movable member having a portion adapted to be submerged in a portion of said liquid and having a downwardly extending central portion arranged to open and close said openings, and means for admitting the gas through said openings on the underside of said movable member thereby causing said member to remain suspended when the gas pressure is on and to descend and close such openings when the gas pressure is decreased.

2. An automatic cut off comprising a hollow casing having an annular chamber partly filled with mercury, a stationary cylinder disposed within said annular chamber and provided with openings for the admission and exit of gas, a central cylinder disposed within said stationary cylinder and adapted to open and close said openings, said cylinder being connected with a second concentric cylinder disposed in said annular chamber and subjected to the buoyant force of the mercury, said central cylinder being provided with openings at its upper end for the admission of gas into said annular chamber.

3. An automatic cut-off comprising a hollow casing provided with inwardly projecting lugs and having an annular chamber therein partly filled with mercury, a stationary tube disposed centrally of said casing and provided with openings, outlet and inlet openings near its lower end arranged to register with the openings in the stationary tube, a movable valve member comprising a cylinder closed at one end and provided with openings arranged to receive the lugs of said casing, the lower part of the cylinder being submerged in the mercury, and a centrally depending tube integral with said cylinder, disposed within said stationary tube and provided with openings at its upper end and arranged to close the openings in said stationary tube at the downward movement, and means projecting through said casing for engaging said movable valve member for resetting it.

CHARLES E. LAHMERS.

Witnesses:
W. I. KINSEY,
JOHN C. JOSS.